(12) United States Patent
Park et al.

(10) Patent No.: US 12,243,975 B2
(45) Date of Patent: *Mar. 4, 2025

(54) METHOD FOR MANUFACTURING SECONDARY BATTERY AND POUCH FOR SECONDARY BATTERY

(71) Applicant: LG Energy Solution, Ltd., Seoul (KR)

(72) Inventors: Sung Chul Park, Daejeon (KR); Sang Wook Kim, Daejeon (KR); Dae Won Lee, Daejeon (KR); Dong Hyeuk Park, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/238,013

(22) Filed: Aug. 25, 2023

(65) Prior Publication Data

US 2023/0411671 A1 Dec. 21, 2023

Related U.S. Application Data

(63) Continuation of application No. 17/551,808, filed on Dec. 15, 2021, now Pat. No. 11,799,122, which is a
(Continued)

(30) Foreign Application Priority Data

Mar. 9, 2018 (KR) .................. 10-2018-0028018

(51) Int. Cl.
  *H01M 50/54* (2021.01)
  *H01M 10/04* (2006.01)
  *H01M 50/105* (2021.01)
(52) U.S. Cl.
  CPC ....... *H01M 10/045* (2013.01); *H01M 50/105* (2021.01); *H01M 50/54* (2021.01)

(58) Field of Classification Search
  CPC ...... H01M 50/50; H01M 50/54; H01M 50/10; H01M 50/20; H01M 10/04; H01M 10/045
  See application file for complete search history.

(56) References Cited

U.S. PATENT DOCUMENTS

2006/0127756 A1 6/2006 Seo
2009/0311592 A1 12/2009 You et al.
(Continued)

FOREIGN PATENT DOCUMENTS

| CN | 108431986 A | 8/2018 |
| CN | 109643768 A | 4/2019 |

(Continued)

OTHER PUBLICATIONS

International Search Report from Application No. PCT/KR2019/000856 mailed Apr. 16, 2019, 2 pages.
(Continued)

*Primary Examiner* — Kenneth J Douyette
(74) *Attorney, Agent, or Firm* — Lerner David LLP (57) ABSTRACT

A method for manufacturing a secondary battery includes a forming step of pressing a pouch sheet by using a press die so that left and right accommodation grooves, which are bilaterally symmetrical to each other and are opened upward, and a bridge connecting the left and right accommodation grooves to each other are formed in the pouch sheet, wherein the bridge protrudes upward with respect to bottom surfaces of the left and right accommodation grooves, and a curved portion having a rounded shape is formed on an upper end of the bridge, a seating step of seating an electrode assembly in one of the left and right accommodation grooves, and a folding step of folding the pouch sheet so that the left and right accommodation grooves face each other.

9 Claims, 7 Drawing Sheets

Related U.S. Application Data continuation of application No. 16/763,120, filed as application No. PCT/KR2019/000856 on Jan. 21, 2019, now Pat. No. 11,283,139.

(56) References Cited

U.S. PATENT DOCUMENTS

| | | |
|---|---|---|
| 2010/0143787 A1 | 6/2010 | Jung et al. |
| 2013/0071696 A1 | 3/2013 | Kim et al. |
| 2013/0101894 A1 | 4/2013 | Baba et al. |
| 2015/0118537 A1 | 4/2015 | Obasih et al. |
| 2016/0093838 A1 | 3/2016 | Kwon et al. |
| 2016/0351863 A1 | 12/2016 | Reibling et al. |
| 2018/0219245 A1 | 8/2018 | Choi et al. |
| 2019/0027714 A1 | 1/2019 | Jung et al. |
| 2019/0237832 A1 | 8/2019 | Ju et al. |
| 2022/0115687 A1 | 4/2022 | Choi et al. |

FOREIGN PATENT DOCUMENTS

| | | |
|---|---|---|
| EP | 3553843 A1 | 10/2019 |
| JP | 2004071301 A | 3/2004 |
| KR | 100895202 B1 | 5/2009 |
| KR | 20140015647 A | 2/2014 |
| KR | 20160036282 A | 4/2016 |
| KR | 20170022156 A | 3/2017 |
| KR | 20170052061 A | 5/2017 |
| KR | 20170058021 A | 5/2017 |
| KR | 20170069980 A | 6/2017 |
| KR | 20170091938 A | 8/2017 |
| WO | 2008056908 A1 | 5/2008 |
| WO | 2017078437 A1 | 5/2017 |

OTHER PUBLICATIONS

Extended European Search Report including Written Opinion for Application No. EP19764190 dated Jan. 12, 2021, 9 pgs.
Search Report for Chinese Application No. 201980005760.2 dated Jan. 18, 2022. 2 pgs.
Extended European Search Report including Written Opinion for Application No. 24155281.9, dated Jul. 1, 2024, pp. 1-11.
Extended European Search Report including Written Opinion for Application No. 24189635.6 dated Nov. 12, 2024, pp. 1-14.

FIG. 7

METHOD FOR MANUFACTURING SECONDARY BATTERY AND POUCH FOR SECONDARY BATTERY

CROSS-REFERENCE TO RELATED APPLICATION

The present application is a continuation of U.S. patent application Ser. No. 11/551,808, filed on Dec. 15, 2021, now U.S. Pat. No. 11,799,122 which is a continuation of U.S. patent application Ser. No. 16/763,120, now U.S. Pat. No. 11,283,139, filed on May 11, 2020, which is a national phase entry under 35 U.S.C. § 371 of International Application No. PCT/KR2019/000856, filed Jan. 21, 2019, which claims the benefit of the priority of Korean Patent Application No. 10-2018-0028018, filed on Mar. 9, 2018, all of the disclosures of which are hereby incorporated by reference in their entirety.

TECHNICAL FIELD

The present invention relates to a method for manufacturing a secondary battery and a pouch for the secondary battery.

BACKGROUND ART

Secondary batteries are rechargeable unlike primarily batteries, and also, the possibility of compact size and high capacity is high. Thus, recently, many studies on rechargeable batteries are being carried out. As technology development and demands for mobile devices increase, the demands for rechargeable batteries as energy sources are rapidly increasing.

Rechargeable batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

Recently, the pouch-type battery in which a stack/folding type electrode assembly is built in a pouch-type battery case provided as an aluminum lamination sheet is attracting much attention due to its low manufacturing cost, small weight, easy shape deformation, and the like, and thus, its usage is gradually increasing.

However, when the pouch accommodating the electrode assembly is folded to manufacture the secondary battery, a wrinkle having a bat-ear shape may occur on the folded portion.

DISCLOSURE OF THE INVENTION

Technical Problem

One aspect of the present invention is to provide a method for manufacturing a secondary battery, through which capacity increases, and an occurrence of a winkle when a battery case is folded is prevented or significantly reduced, and a pouch for the secondary battery.

Technical Solution

A method for manufacturing a secondary battery according to an embodiment of the present invention includes a forming step of pressing a pouch sheet by using a press die so that left and right accommodation grooves, which are bilaterally symmetrical to each other and are opened upward, and a bridge connecting the left and right accommodation grooves to each other are formed in the pouch sheet, wherein the bridge protrudes upward with respect to bottom surfaces of the left and right accommodation grooves, and a curved portion having a rounded shape is formed on an upper end of the bridge, a seating step of seating an electrode assembly in one of the left and right accommodation grooves, and a folding step of folding the pouch sheet so that the left and right accommodation grooves face each other.

A pouch for a secondary battery according to an embodiment of the present invention includes a pouch sheet, wherein in an unfolded form, the pouch sheet includes left and right accommodation grooves for accommodating an electrode assembly when the pouch sheet is in a folded form and which are bilaterally symmetrical to each other and are opened upward and a bridge connecting the left and right accommodation grooves to each other, wherein the bridge protrudes upward with respect to bottom surfaces of the left and right accommodation grooves, and a curved portion having a rounded shape is formed on an upper end of the bridge.

Advantageous Effects

According to the present invention, the battery case may be formed with the structure that is optimized to accommodate the electrode assembly and then be folded to increase in capacity and prevent the wrinkle such as the bat-ear shape from occurring or significantly reduce the occurrence of the wrinkle when the battery case is folded.

MODE FOR CARRYING OUT THE INVENTION

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 1:
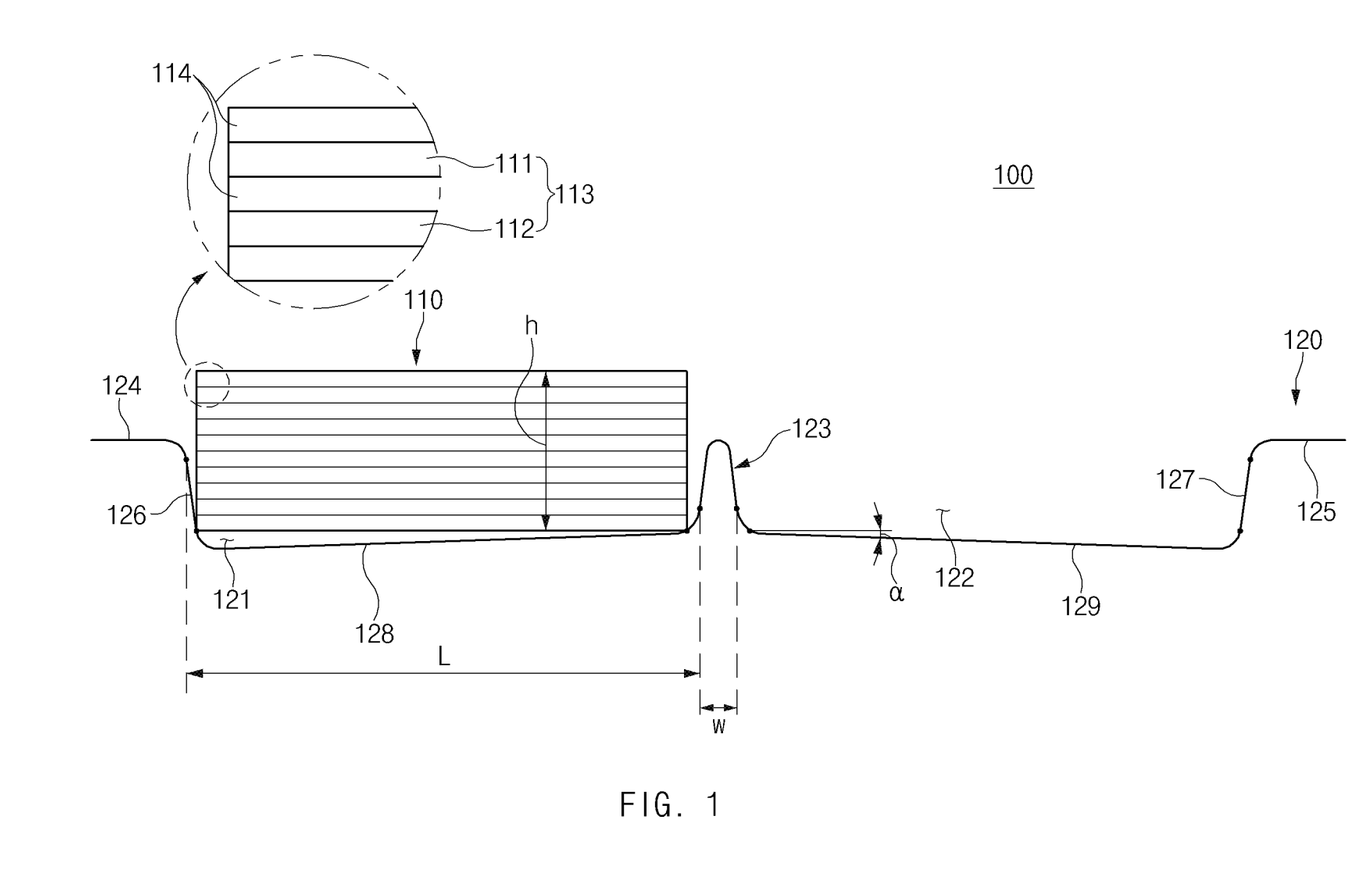
FIG. 1 is a cross-sectional view illustrating a forming step in a method for manufacturing a secondary battery according to an embodiment of the present invention.

FIG. 1 is a cross-sectional view illustrating a forming step in a method for manufacturing a secondary battery according to an embodiment of the present invention.

Referring to FIG. 1, a method for manufacturing a secondary battery according to an embodiment of the present invention comprises a forming step of forming left and right accommodation grooves 121 and 122 and a bridge on a pouch sheet 120 and a folding step of folding the pouch sheet 120 so that the left and right accommodation grooves 121 and 122 face each other.

Hereinafter, the method for manufacturing the secondary battery according to an embodiment of the present invention will be described in more detail with reference to FIGS. 1 to 7.

Referring to FIG. 1, in the forming step, the pouch sheet 120 is formed to form an accommodation part into which the electrode assembly 110 is accommodated. Here, in the forming step, the pouch sheet 120 may be pressed by using a press die so that the left and right accommodation grooves 121 and 122, which are bilaterally symmetrical to each other and opened upward, and the bridge 123 connecting the left and right accommodation grooves 121 and 122 to each other are formed in the pouch sheet 120.

Also, in the forming step, the pouch sheet 120 may be formed to be inclined so that bottom surfaces 128 and 129 of the left and right accommodation grooves 121 and 122 are bilaterally symmetrical to each other. Here, in the forming step, the bottom surfaces 128 and 129 of the left and right accommodation grooves 121 and 122 have inclinations gradually decreasing in a direction that is away from the bridge 123.

Furthermore, in the forming step, for example, each of the bottom surfaces 128 and 129 of the left and right accommodation grooves 121 and 122 may have an inclination that decreases at an angle of 1° to 5°. That is, in the forming step, for example, each of the bottom surfaces 128 and 129 of the left and right accommodation grooves 121 and 122 may have an angle α of inclination that decreases at an angle of 1° to 5°.

Here, in the forming step, as a specific example, each of the bottom surfaces 128 and 129 of the left and right accommodation grooves 121 and 122 has an inclination that decreases at an angle of 1.5° to 3°. Thus, in the forming step, when each of the bottom surfaces 128 and 129 of the left and right accommodation grooves 121 and 122 is formed to be equal to or less than an upper limit value, an occurrence of cracks due to pressing of the pouch 120 may be prevented.

When each of the bottom surfaces 128 and 129 of the left and right accommodation grooves 121 and 122 is formed to be equal to or greater than a lower limit value, the occurrence of the cracks due to a decrease in forming depth within the pouch 120 may be prevented.

In the forming step, for example, each of the left and right accommodation grooves 121 and 122 may have a width of 95 mm to 97 mm. Here, as a specific example, each of the left and right accommodation grooves 121 and 122 may have a width of 96.7 mm.

The electrode assembly 110 may be a chargeable and dischargeable power generation element and have a structure in which one or more electrodes 113 and a separator 114 are combined and alternately stacked.

The electrodes 113 may comprise a positive electrode 111 and a negative electrode 112. Also, the separator 114 separates and electrically insulates the positive electrode 111 and the negative electrode 112 from each other.

The positive electrode 111 may comprise a positive electrode collector (not shown) and a positive electrode active material (not shown) applied to the positive electrode collector, and the negative electrode 112 may comprise a negative electrode collector (not shown) and a negative electrode active material (not shown) applied to the negative electrode collector.

For example, the positive electrode collector may be provided as foil made of an aluminum (Al) material.

The positive electrode active material may comprise, for example, lithium manganese oxide, lithium cobalt oxide, lithium nickel oxide, lithium iron phosphate, or a compound containing at least one of these and mixtures thereof.

For example, the negative electrode collector may be provided as foil made of a copper (Cu) or nickel (Ni) material.

The negative electrode active material may comprise synthetic graphite, lithium a metal, a lithium alloy, carbon, petroleum coke, activated carbon, graphite, a silicon compound, a tin compound, a titanium compound, or an alloy thereof.

The separator 114 is made of an insulation material and multiple separators 114 can be placed such that the positive electrode and the negative electrode are alternately stacked. Here, the separator 114 may be disposed between the positive electrode and the negative electrode and also on outer surfaces of the positive electrode and the negative electrode. Here, the separator 114 may be made of, for example, a polyolefin-based resin film such as polyethylene or polypropylene having micropores.

Figure 2:
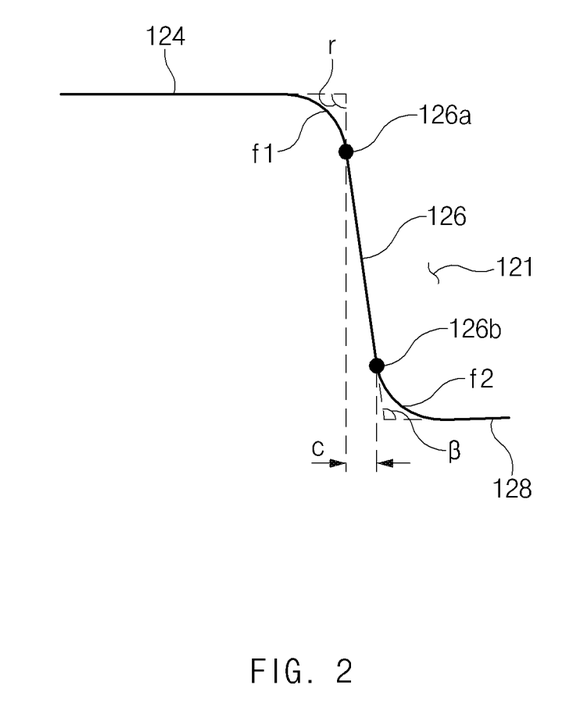
FIG. 2 is a cross-sectional view illustrating a portion of a pouch sheet comprising an inflection surface in the method for manufacturing the secondary battery according to an embodiment of the present invention.

FIG. 2 is a cross-sectional view illustrating a portion of the pouch sheet comprising an inflection surface in the method for manufacturing the secondary battery according to an embodiment of the present invention.

Referring to FIGS. 1 and 2, in the forming step, a first bending part having a shape in which outer side surfaces of the left and right accommodation grooves 121 and 122 are respectively bent downward with respect to outer circumferential surfaces 124 and 125 of the pouch sheet 120 may have a first curved surface f1 having a rounded shape. Here, the outer circumferential surfaces 124 and 125 of the pouch sheet 120 may mean, for example, surfaces disposed on outer edges of the pouch sheet 120.

Also, in the forming step, a second bending part having a shape in which outer side surfaces of the left and right accommodation grooves 121 and 122 are respectively bent upward with respect to the bottom surfaces 128 and 129 of the left and right accommodation grooves 121 and 122 may have a second curved surface f2 having a rounded shape.

Furthermore, in the forming step, for example, the pouch sheet 120 may be formed so that a width or clearance c of each of inflection surfaces 126 and 127 formed between the first curved surface f1 and the second curved surface f2 is maintained to be equal to or less than 0.5 mm. Here, in the forming step, as a specific example, the pouch sheet 120 may be formed so that the clearance c of each of the inflection surfaces 126 and 127 formed between the first curved surface f1 and the second curved surface f2 is maintained to be equal to or less than 0.2 mm. Thus, in the forming step, when the clearance c of each of the inflection surfaces 126 and 127 formed between the first curved surface f1 and the second curved surface f2 is formed to be equal to or less than an upper limit value, space efficiency may be optimized. That is, as the clearance c of each of the inflection surfaces 126 and 127 formed between the first curved surface f1 and the second curved surface f2 decreases, a volume of an empty space between the electrode assembly 110 and the pouch sheet 120, which have rectangular shapes, may decrease to improve the space efficiency.

Also, in the forming step, the pouch sheet 120 may be formed so that the inflection points 126 and 127 are formed as a plane. Here, the inflection surface 126 may be a surface between a first inflection point 126a and a second inflection point 126b.

Here, in the forming step, for example, the pouch sheet 120 may be formed so that each of an angle r between each of the outer circumferential surfaces 124 and 125 and each of the inflection surfaces 126 and 127 of the pouch sheet 120 and an angle β between each of the inflection surfaces 126 and 127 and each of the bottom surfaces 128 and 129 of the left and right accommodation grooves 121 and 122 is formed at an angle of 90° to 100°. Here, in the forming step, as a specific example, the pouch sheet 120 may be formed so that each of the angle r between each of the outer circumferential surfaces 124 and 125 and each of the inflection surfaces 126 and 127 of the pouch sheet 120 and the angle β between each of the inflection surfaces 126 and 127 and each of the bottom surfaces 128 and 129 of the left and right accommodation grooves 121 and 122 is formed at an angle of 93° to 98°.

Thus, in the forming step, each of the angle r between each of the outer circumferential surfaces 124 and 125 and each of the inflection surfaces 126 and 127 of the pouch sheet 120 and the angle β between each of the inflection surfaces 126 and 127 and each of the bottom surfaces 128 and 129 of the left and right accommodation grooves 121 and 122 is formed to be equal to or less than an upper limit value, the clearance c of each of the inflection surfaces 126 and 127 formed between the first curved surface f1 and the second curved surface f2 may be narrowed. Also, when each of the angle r between each of the outer circumferential surfaces 124 and 125 and each of the inflection surfaces 126 and 127 of the pouch sheet 120 and the angle β between each of the inflection surfaces 126 and 127 and each of the bottom surfaces 128 and 129 of the left and right accommodation grooves 121 and 122 is formed to be equal to or greater than a lower limit value, machinability may be improved.

Figure 3:
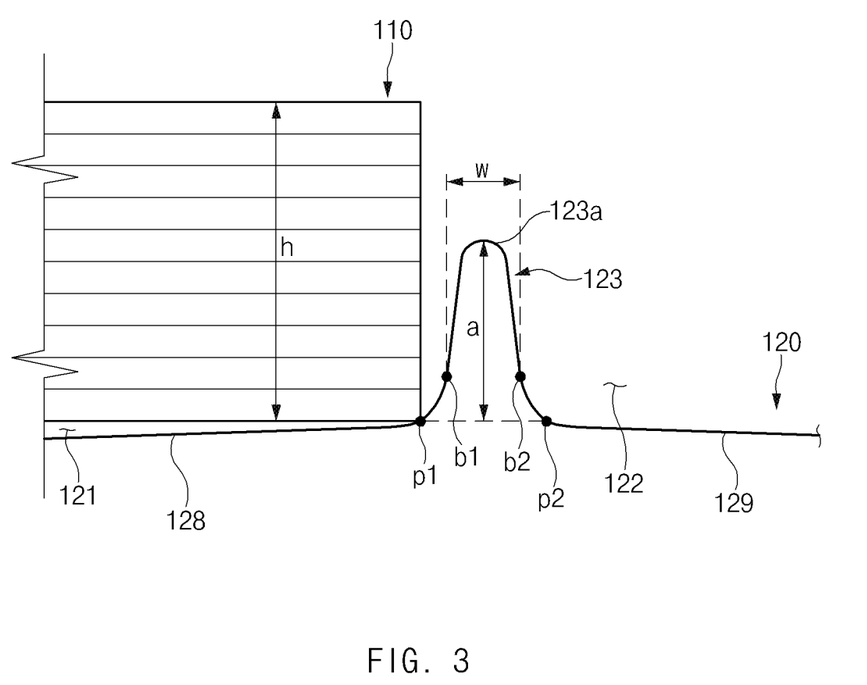
FIG. 3 is a cross-sectional view illustrating a main part of the pouch sheet in the method for manufacturing the secondary battery according to an embodiment of the present invention.
Figure 4:
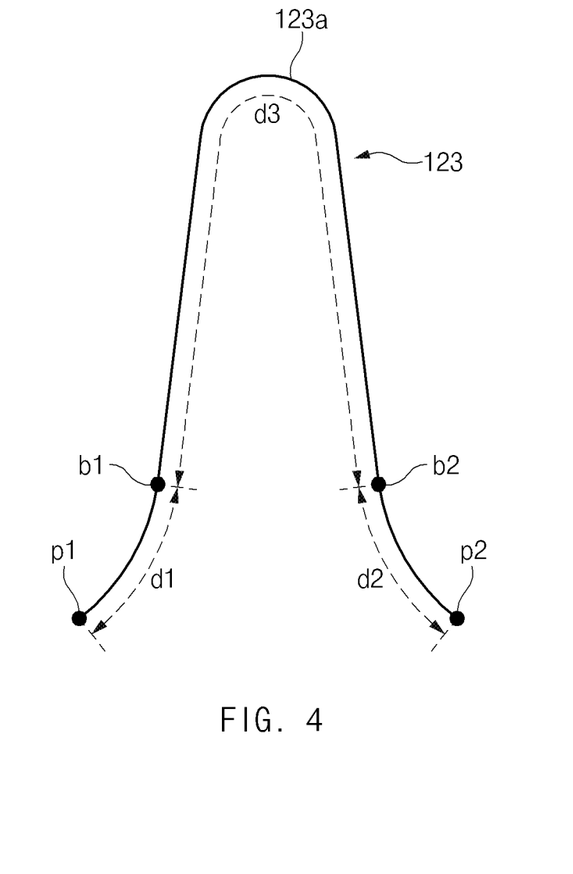
FIG. 4 is a cross-sectional view illustrating a portion of the pouch sheet comprising a bridge in the method for manufacturing the secondary battery according to an embodiment of the present invention.

FIG. 3 is a cross-sectional view illustrating a main part of the pouch sheet in the method for manufacturing the secondary battery according to an embodiment of the present invention, and FIG. 4 is a cross-sectional view illustrating a portion of the pouch sheet comprising a bridge in the method for manufacturing the secondary battery according to an embodiment of the present invention.

Referring to FIGS. 3 and 4, in the forming step, the pouch sheet 120 may be formed so that the bridge 123 protrudes upward from the bottom surfaces 128 and 129 of the left and right accommodation parts 121 and 122, and a curved portion having a rounded shape is formed on an upper end 123a of the bridge 123.

Here, in the forming step, the pouch sheet 120 may be formed so that the upper end 123a of the bridge 123 has a semicircular shape.

Here, the bridge 123 may have a width W defined by a width of a protrusion protruding between the left and right accommodation grooves 121 and 122, and reference or end points of the width of the protrusion may be defined by inflection points b1 and b2 between bending parts adjacent the bottom surfaces 128 and 129 of the left and right accommodation grooves 121 and 122 and side surfaces of the protrusion.

Also, in the forming step, for example, the pouch sheet 120 may be formed so that the bridge 123 has a width W of 4 mm or less. Also, in the forming step, as a specific example, the pouch sheet 120 may be formed so that the bridge 123 has a width W of 1 mm to 2 mm. Thus, as the width W of the bridge 123 is formed to be equal to or greater than a lower limit value, an occurrence of a wrinkle having a bat-ear shape on the folded portion after the pouch sheet 120 is folded so that the left and right accommodation grooves 121 and 122 correspond to or face each other may be prevented or significantly reduced.

In the forming step, when a length along the pouch sheet 120 between a portion p1, which contacts a lower edge of the electrode assembly 110 adjacent to the bridge 123, and the bridge 123 is d1, a length along the pouch sheet 120 between a portion p2, which contacts an upper edge of the electrode assembly 110 adjacent to the bridge 123, and the bridge 123 is d2, a length along the pouch sheet 120 of the bridge 123 is d3, and a height of the electrode assembly 110 seated on the pouch sheet 120 is h, the pouch sheet 120 may be formed to satisfy following conditional expression (1).

$$h \leq d1 + d2 + d3 \qquad \text{Conditional Expression (1)}$$

Thus, as the conditional expression (1) is satisfied, when the pouch sheet 120 is folded, the side surface of the electrode assembly 110 may be completely surrounded. Also, if the conditional expression (1) is not satisfied, when the pouch sheet 120 is folded so that the left and right accommodation grooves 121 and 122 face each other, the left and right accommodation grooves 121 and 122 may not correspond to each other but be dislocated with respect to each other.

In the forming step, when a height of the electrode assembly 110 seated on the pouch sheet 120 is h, and a protruding height of the bridge 123 with respect to the bottom surfaces 128 and 129 of the pouch sheet 120 is a, the pouch sheet 120 may formed to satisfy following conditional expression (2).

$$h/2 \geq a \qquad \text{Conditional Expression (2)}$$

Thus, as the conditional expression (2) is satisfied, when the pouch sheet 120 is folded, a phenomenon in which a wrinkle occurs at a remaining portion except for the portion that completely surrounds the side surface of the electrode assembly may be prevented. That is, a phenomenon in which the pouch sheet does not fully closely attach to the side surface of the electrode assembly 110 such that it causes the wrinkle after the folding when a portion of the pouch sheet 120, which faces the side surface of the electrode assembly 110, has a length that is significantly greater than that of the side surface of the electrode assembly 110 may be prevented or significantly reduced.

Figure 5:
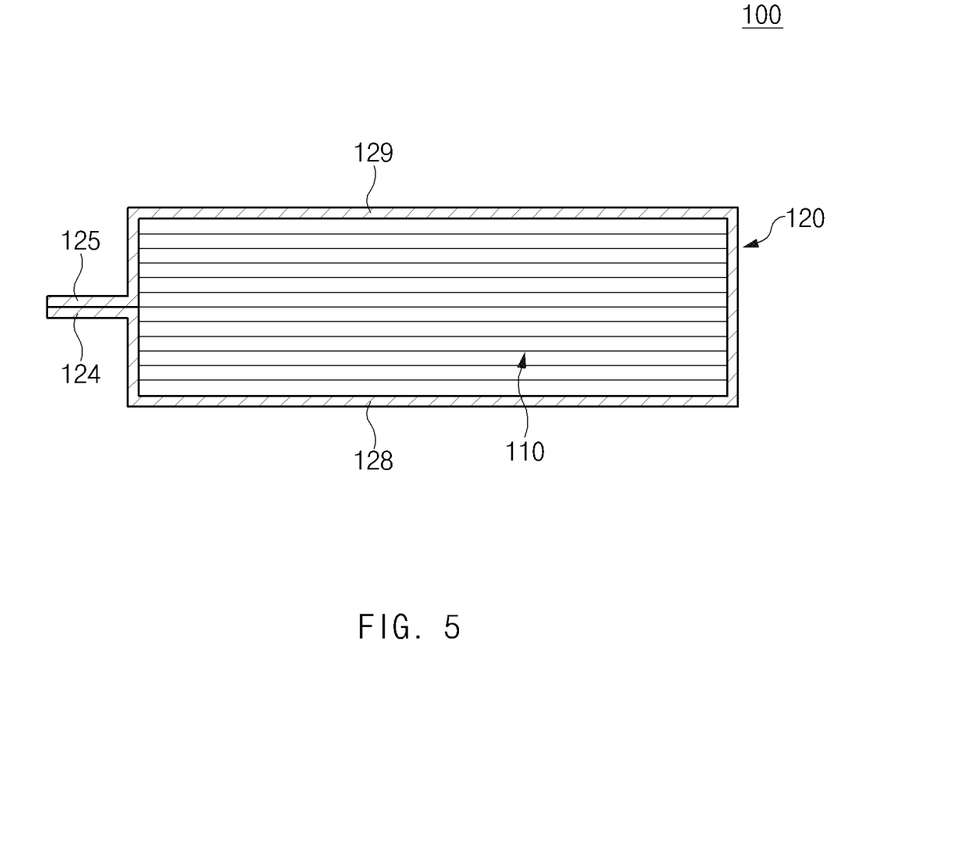
FIG. 5 is a cross-sectional view illustrating a folding step in the method for manufacturing the rechargeable battery according to an embodiment of the present invention.

FIG. 5 is a cross-sectional view illustrating the folding step in the method for manufacturing the rechargeable battery according to an embodiment of the present invention.

Referring to FIG. 5, in the folding step, the electrode assembly 110 may be seated on one of the left and right accommodation grooves 121 and 122, and then the pouch sheet 120 may be folded so the left and right accommodation grooves 121 and 122 face each other to manufacture the secondary battery 100.

Here, in the folding step, a sealing step of thermally fusing and sealing the outer circumferential surfaces 124 and 125 of the pouch sheet 120 may be further performed. Thus, the accommodation space in which the electrode assembly 110 is accommodated may be sealed to be blocked from the outside.

Figure 6:
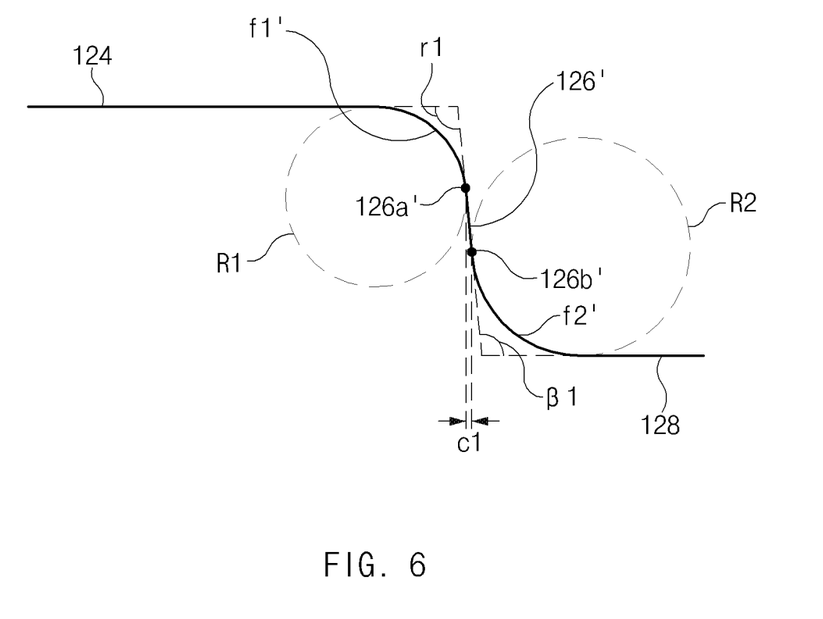
FIG. 6 is a cross-sectional view illustrating an example of the forming step in the method for manufacturing the secondary battery according to an embodiment of the present invention.
Figure 7:
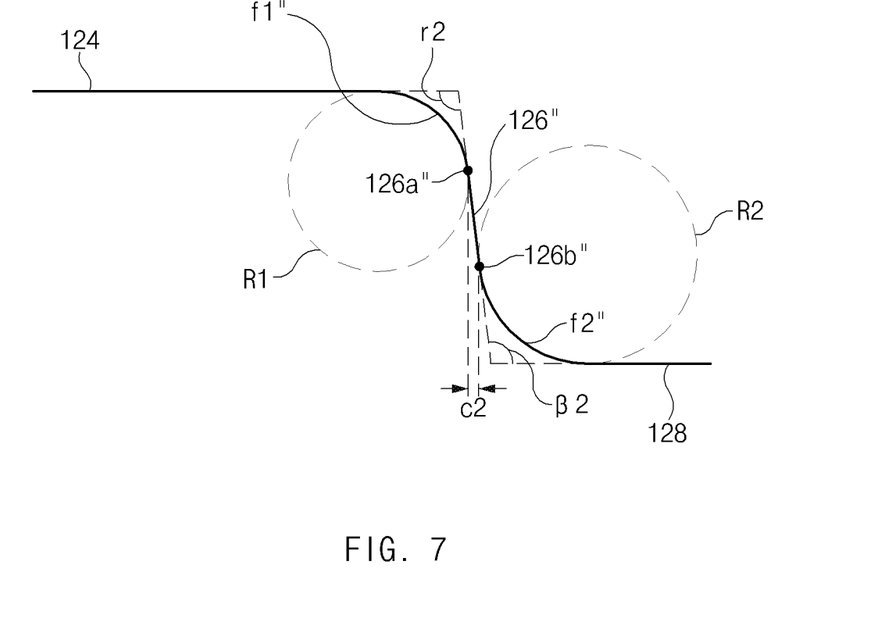
FIG. 7 is a cross-sectional view illustrating another example of the forming step in the method for manufacturing the secondary battery according to an embodiment of the present invention.

FIG. 6 is a cross-sectional view illustrating an example of the forming step in the method for manufacturing the secondary battery according to an embodiment of the present invention, and FIG. 7 is a cross-sectional view illustrating another example of the forming step in the method for manufacturing the secondary battery according to an embodiment of the present invention.

Referring to FIG. 6, in the forming step, for example, the pouch sheet 120 may be formed so that a clearance c1 of an inflection surface 126' formed between a first curved surface f1' and a second curved surface f2' is 0.35 mm. Here, in the forming step, the pouch sheet 120 may be formed so that each of an angle r1 between each of the outer circumferential surfaces 124 and 125 and the inflection surface 126' of the pouch sheet 120 and an angle β1 between the inflection surface 126' and each of the bottom surfaces 128 and 129 of the left and right accommodation grooves 121 and 122 is formed at an angle of 95°. Here, the first curved surface f1' may be formed as a portion of a circle having a radius R1, and the second curved surface f2' may be formed as a portion of a circle having a radius R2. Here, the radius R1 is 1.5 mm, and the radius R2 is 2 mm.

Referring to FIG. 7, in the forming step, for another example, the pouch sheet 120 may be formed so that a clearance c2 of an inflection surface 126" formed between a first curved surface f1" and a second curved surface f2" is 0.25 mm. Here, in the forming step, the pouch sheet 120 may be formed so that each of an angle r2 between each of the outer circumferential surfaces 124 and 125 and the inflection surface 126" of the pouch sheet 120 and an angle β2 between the inflection surface 126" and each of the bottom surfaces 128 and 129 of the left and right accommodation grooves 121 and 122 is formed at an angle of 96.1°. Here, the first curved surface f1" may be formed as a portion of a circle having a radius R1, and the second curved surface f2" may be formed as a portion of a circle having a radius R2. Here, the radius R1 is 1.5 mm, and the radius R2 is 2 mm.

Embodiment 1

When left and right accommodation grooves 121 and 122 that are bilaterally symmetrical to each other are formed in a pouch sheet, the pouch sheet was formed so that each of bottom surfaces 128 and 129 of the left and right accommodation grooves 121 and 122 is inclined. Also, a bridge had a width W of 4.0 mm, a clearance c of an inflection surface formed between a first curved surface f1 and a second curved surface f2 was 0.5 mm, and then, a secondary battery was manufactured (see FIGS. 1 to 3).

Embodiment 2

Referring to FIGS. 1 and 2, when left and right accommodation grooves 121 and 122 that are bilaterally symmetrical to each other are formed in a pouch sheet, the pouch sheet was formed so that each of bottom surfaces 128 and 129 of the left and right accommodation grooves 121 and 122 is inclined. Also, a bridge had a width W of 2.0 mm, a clearance c of an inflection surface formed between a first curved surface f1 and a second curved surface f2 was 0.35 mm, and then, a secondary battery was manufactured (see FIGS. 1 to 3).

Comparative Example 1

When left and right accommodation grooves 121 and 122 that are bilaterally symmetrical to each other are formed in a pouch sheet, the pouch sheet was formed so that each of bottom surfaces of the left and right accommodation grooves is not inclined but horizontally flat. Also, a bridge had a width W of 5.0 mm, a clearance c of an inflection surface formed between a first curved surface f1 and a second curved surface f2 was 1.0 mm, and then, a secondary battery was manufactured.

TABLE 1

|  | Embodiment 1 | Embodiment 2 | Comparative Example 1 |
| --- | --- | --- | --- |
| Formed shape of bottom surface of accommodation groove (existence and nonexistence of inclination of bottom surface) | Inclination formation (inclination of bottom surface ◯) | Inclination formation (inclination of bottom surface ◯) | Planar surface formation (inclination of bottom surface X) |
| Width W of bridge (W) | 4.0 mm | 2.0 mm | 5.0 mm |
| Clearance c of inflection surface formed between first curved surface f1 and second curved surface f2 | 0.5 mm | 0.35 mm | 1.0 mm |
| Size of wrinkle at folded portion (Bat-ear size) | 3.4 mm | 2 mm or less | 4.5 mm or more |

As shown in Table 1, in Comparative Example 1, a wrinkle having a bat-ear shape has a size of 4.5 mm or more. On the other hand, in Embodiment 1, a wrinkle having a bat-ear shape has a size of 3.4 mm, and in Embodiment 2, a wrinkle having a bat-ear shape has a size of 2 mm or less. Thus, it is seen that the wrinkle at the folded portion when the pouch sheet is folded in Embodiment 1 is smaller than that in Comparative Example 1, and also, it is seen then the wrinkle in Embodiment 2 is smaller than that in Comparative Example 1. As a result, in the secondary battery manufactured in the method for manufacturing the pouch for the secondary battery according to an embodiment of the present invention, as illustrated through Embodiments 1 and 2, the wrinkle at the folded portion is significantly reduced to significantly reduce damage of an outer appearance and an occurrence of cracks in comparison with Comparative Example 1 of the manufacturing method according to the related art. Hereinafter, a pouch for a secondary battery according to an embodiment of the present invention will be described.

Referring to FIG. 1, a pouch 120 for a secondary battery according to an embodiment of the present invention comprises left and right accommodation grooves 121 and 122, which accommodate an electrode assembly when the pouch sheet is in a folded form, are bilaterally symmetrical to each other, and are opened upward, and a bridge 123 connecting the left and right accommodation grooves 121 and 122 to each other.

The pouch for the secondary battery according to an embodiment of the present invention relates to the pouch 120 for the secondary battery, which is provided in the secondary battery 100 manufactured through the method for manufacturing the secondary battery according to the forgoing embodiment of the present invention, and thus, duplicated contents will be briefly described.

Referring to FIG. 2, a first bending part having a shape in which outer side surfaces of left and right accommodation grooves 121 and 122 are respectively bent downward with respect to outer circumferential surfaces 124 and 125 of the pouch sheet 120 may have a first curved surface f1 having a rounded shape.

Also, a second bending part having a shape in which outer side surfaces of the left and right accommodation grooves 121 and 122 are respectively bent upward with respect to the bottom surfaces 128 and 129 of the left and right accommodation grooves 121 and 122 may have a second curved surface f2 having a rounded shape. Furthermore, the pouch sheet 120 may be formed so that a clearance C of each of inflection surfaces 126 and 127 formed between the first curved surface f1 and the second curved surface f2 is maintained to be equal to or less than 0.5 mm.

The pouch sheet 120 may be formed so that each of the inflection surfaces 126 and 127 has a planar shape, and each of an angle r between each of the outer circumferential surfaces 124 and 125 and each of the inflection surfaces 126 and 127 of the pouch sheet 120 and an angle β between each of the inflection surfaces 126 and 127 and each of the bottom surfaces 128 and 129 of the left and right accommodation grooves 121 and 122 is formed at an angle of 93° to 98°.

Referring to FIG. 3, the bridge 123 may protrude upward from the bottom surfaces 128 and 129 of the left and right accommodation parts 121 and 122, and a curved portion having a rounded shape may be formed on an upper end 123*a* of the bridge 123.

Also, the pouch sheet 120 may be formed so that the bridge 123 has a width W of 1 mm to 2 mm.

While the present invention has been particularly shown and described with reference to exemplary embodiments thereof, the method for manufacturing the secondary battery according to the present invention and the pouch for the secondary battery are not limited thereto. It will be understood by those of ordinary skill in the art that various changes in form and details may be made therein without departing from the spirit and scope of the invention.

Furthermore, the scope of protection of the present invention will be clarified by the appended claims.

The invention claimed is:

1. A pouch for a secondary battery, the pouch comprising:
a pouch sheet, wherein in an unfolded form, the pouch sheet includes:
   left and right accommodation grooves for accommodating an electrode assembly when the pouch sheet is in a folded form and which are bilaterally symmetrical to each other and are opened upward; and
   a bridge connecting the left and right accommodation grooves to each other,
wherein the bridge protrudes upward with respect to bottom surfaces of the left and right accommodation grooves, and a curved portion having a rounded shape is formed on an upper end of the bridge,
wherein the bottom surfaces of the left and right accommodation grooves are inclined to be bilaterally symmetrical to each other,
wherein the bottom surfaces of the left and right accommodation grooves have inclinations decreasing in a direction that is away from the bridge.

2. The pouch of claim 1, wherein the inclination of each of the bottom surfaces of the left and right accommodation grooves decreases at an angle of 1° to 5°.

3. The pouch of claim 1, wherein the inclination of each of the bottom surfaces of the left and right accommodation grooves decreases at an angle of 1.5° to 3°.

4. The pouch of claim 1, wherein lower curved portions having rounded shape are formed on a lower end of the bridge and connected to each of the bottom surfaces of the left and right accommodation grooves.

5. The pouch of claim 1, wherein in the pouch sheet, in its unfolded form:
   a first bending part having a shape in which outer side surfaces of the left and right accommodation grooves are respectively bent downward with respect to outer circumferential surfaces of the pouch sheet has a first curved surface having a rounded shape,
   a second bending part having a shape in which the outer side surfaces of the left and right accommodation grooves are respectively bent upward with respect to the bottom surfaces of the left and right accommodation grooves has a second curved surface having a rounded shape, and
   a width of each of inflection surfaces of the outer side surfaces that are formed between the first curved surface and the second curved surface is 0.5 mm or less.

6. The pouch of claim 5, wherein, in the pouch sheet, in its unfolded form, each of the inflection surfaces has a planar shape, and
each of an angle between each of the outer circumferential surfaces and each of the inflection surfaces of the pouch sheet and an angle between each of the inflection surfaces and each of the bottom surfaces of the left and right accommodation grooves is 93° to 98°.

7. The pouch of claim 1, wherein, in the pouch sheet, in its unfolded form, the bridge has a width of 1 mm to 2 mm.

8. A secondary battery comprising:
the pouch of claim 1; and
an electrode assembly accommodated in the left and right accommodation grooves with the pouch sheet in a folded form so that the left and right accommodation grooves face each other.

9. The pouch of claim 1, wherein, in the pouch sheet, in its unfolded form, the bridge has a width of 4 mm or less.

* * * * *